United States Patent [19]

Leon et al.

[11] 4,325,686

[45] Apr. 20, 1982

[54] APPARATUS FOR DENSIFYING POWDERS OF SUB-MICRON PARTICLE SIZE

[75] Inventors: Gonzalo S. Leon; John E. Fraize, both of Sudbury, Mass.; Richard C. Fortier, University City, Mo.

[73] Assignee: Cabot Corporation, Boston, Mass.

[21] Appl. No.: 211,379

[22] Filed: Nov. 28, 1980

[51] Int. Cl.$^3$ .............................................. B29D 7/14
[52] U.S. Cl. ................... 425/371; 425/372; 425/373; 425/812
[58] Field of Search ............... 425/79, 363, 371, 372, 425/373, 812

[56] References Cited

U.S. PATENT DOCUMENTS 2,642,013  6/1953  Enoch ................................. 425/371
3,779,686  12/1973 Kerttula et al. ..................... 425/371
3,860,368  1/1975  Kerttula et al. ..................... 425/371

Primary Examiner—James R. Hall
Attorney, Agent, or Firm—Jack Schuman; Barry R. Blaker; Lawrence A. Chaletsky

[57] ABSTRACT

There is disclosed herein powder densifying apparatus comprising a pair of opposed gas-permeable belts arranged to either side of a common axis so as to define a generally convergent densifying zone between their adjacent faces. The belts are multiply supported spanwise by a plurality of opposed spaced apart support rolls, each opposed pair of rolls defining a densifying station therebetween. The gas-permeable belts are driven toward the convergent end of the densifying zone at substantially equal speeds while powder material to be densified is fed into the divergent end of the densifying zone at a rate sufficient to maintain a substantially complete fill thereof.

13 Claims, 4 Drawing Figures

APPARATUS FOR DENSIFYING POWDERS OF SUB-MICRON PARTICLE SIZE

BACKGROUND OF THE INVENTION

1. Field of the Invention

The present invention relates generally to a powder densifying apparatus specifically adapted to densify sub-micron size powder materials.

2. Description of the Prior Art

Many materials of commerce are, as originally produced, in the form of light, fluffy and voluminous powders of low apparent densities. Exemplary of these are the so-called "fumed" metal and metalloid oxides produced by high temperature vapor phase oxidation or hydrolysis of compounds of the corresponding metals or metalloids. So too are the carbon blacks produced by any of the well-known furnace, thermal, plasma or channel processes. Such powder materials are normally first collected in the form of sub-micron powders having apparent densities of less than about 25 kg/m$^3$. In this very light and voluminous state these powder materials are expensive to package and ship since they occupy substantial volume per unit weight thereof. Too, the ultimate consumer of such powder materials often experiences difficulties in their handling and/or in their compounding into finished product formulations since, if not first, densified, powder materials of low apparent densities tend to be dusty and tend to bridge hopper outlets, plug orifices, form unwanted deposits and cause other innumerable difficulties in their conveyance, metering and handling.

In an effort to resolve such difficulties it is common practice to subject sub-micron powder materials of low apparent densities to one or more various densifying treatments prior to their shipment or use. Of course, in the densifying of such materials, due precautions need be taken to prevent deleterious alteration of their desirable properties. For instance, it is usually important that the densifying of such materials as fumed silicas and carbon blacks be undertaken in such manner that the dispersability of the densified powder product in the intended end item composition or formulation is not excessively deleteriously affected.

Carbon blacks find a major use as reinforcing agents in natural and synthetic rubber formulations. In this application, the end item rubber formulation is usually produced by mastication of the solid ingredients of the formulation, including the carbon black, into the elastomeric stock. The shear or mixing forces generated under typical rubber mastication conditions, such as is accomplished in roll mills or internal mixing equipments of the Banbury type, is generally of a sufficiently high order as to allow the carbon black manufacturer to supply the carbon black in a densified agglomerated or pelleted form without substantial degradation of the reinforcing properties of the carbon black. Carbon blacks also find extensive utility as black pigments in paints, enamels, lacquers and thermoplastics. In these applications, of course, the dispersion character of the carbon black is often of major importance. Failure to produce good and uniform dispersions of carbon blacks in these end items under conventional mixing conditions can seriously and adversely affect the desired properties thereof. Moreover, since the relatively large shear forces generated during the course of normal rubber compounding operations are generally not attainable in the preparation of liquid or thermoplastic carbon black dispersions, it is not normally possible in these applications to counter poor dispersion characteristics of a particular carbon black pellet batch simply by increasing mixing time or energy.

Two types of apparatus are conventionally employed in the preparation of pelleted carbon blacks. One type is basically a rotating drum having an inlet end and a discharge end. The "fluffy" carbon black powder, which may or may not be prewetted with water or other pelletizing agents, is charged into the inlet end of the drum and is caused to tumble about therein, thereby to coalesce the minute particles thereof into larger rounded agglomerates or pellets. The formed pellets, if wetted with water, are finished by drying thereof. Exemplary of such drum pelletizing apparatus is, for instance, that disclosed in U.S. Pat. No. 2,812,541, G. J. Webster et al., Nov. 12, 1957. Another type of apparatus for densifying and pelletizing carbon blacks comprises a static cylindrical enclosure, oriented slightly off-the-horizontal, which enclosure is equipped with a coaxial rotating shaft therethrough to which there are fixed a multiplicity of radially oriented pins. The lengths of said pins are such that the free ends thereof are located substantially adjacent the walls of the enclosure. The "fluffy" carbon black powder is charged into the higher end of the enclosure and, by rotation of the agitator shaft, the radial pins are continuously driven through the bed of carbon black, thereby densifying and coalescing same into pelleted form and, in most instances, aiding to drive the mass of carbon black towards the lower discharge end of the enclosure. As with the drum pelletizing apparatus mentioned previously, various liquid pelletizing agents can be, if desired, added to the agitating bed of black within the pin pelletizer apparatus and/or the black can be prewetted prior to its introduction into the cylindrical enclosure thereof. Pin pelletizers of this type are disclosed in such patent literature as: U.S. Pat No. 3,390,424, R. J. Fortune, July 2, 1968; U.S. Pat. No. 3,891,366, Wilson H. Rushford, June 24, 1975 and U.S. Pat. No. 4,136,975, Glenn J. Forseth, Jan. 30, 1979. The resulting densified pellets from either of the foregoing types of apparatuses, while usually adequate for rubber reinforcement purposes, are nevertheless often possessed of some detrimental characteristics, certain of which can seriously affect their performance as pigments for liquid or thermoplastic compositions. For instance, it is often found that pelleted carbon black powders of the prior art can be of non-uniform density, either in terms of pellet-to-pellet densities or in terms of intra-pellet densities. As to this last, it is often found that the density of the exterior surfaces of carbon black pellets produced in either of the foregoing types of apparatus is substantially greater than that of the interiors or cores thereof. Too, pelletizing or densifying operations of the foregoing types are often difficult to control in view of the fact that pelleted product quality and uniformity is usually dependent upon maintenance of an accurate and continuous flow of the fluffy carbon black powder feed material into the inlet ends of the pelletizer apparatuses. As mentioned previously, it is normally difficult to control the flow of such light sub-micron powders with the degree of accuracy necessary to achieve good densed product uniformity.

Fumed sub-micron silicas find extensive commercial utility as reinforcing agents for polymers, particularly silicone rubber and as thickening or thixotropic agents for various liquids, particularly polyester gel coat resins and hydrocarbon oils. As with the fluffy carbon blacks, fumed silicas are also generally found to be dusty materials which are susceptible to electrostatic charge buildup and are difficult to handle, meter and convey. Accordingly, it is conventional to densify fumed silicas by vibratory treatment thereof in a holding bin preparatory to packaging for shipment. Somewhat further densification can be achieved by vacuum bagging. Where the fumed silica is intended to be employed as a silicone rubber reinforcing agent it can be subjected to a more rigorous densifying treatment. Said treatment, and the apparatus employed therefor, is disclosed in detail in the following patent literature, all of which is in the name of Helmut Reinhardt, et al.: U.S. Pat. No. 3,838,785, June 12, 1973; 3,742,566, July 3, 1973; U.S. Pat. No. 3,762,851, Oct. 2, 1973 and U.S. Pat. No. 3,860,682, Jan. 14, 1975. Basically, the apparatus employed is a chamber housing a pair of rolls maintained in axial parallelism and which rolls are in a fixed, spaced apart association such as to define a narrow "nip" or gap therebetween. At least one of the rolls is composed of a gas-permeable material and the interior of the roll is placed in communication with a vacuum source. The fumed silica powder material is fed to the chamber and the rolls are operated in a counter-rotating manner, thereby to capture the fumed silica powder in the nip therebetween and to express air therefrom. Meanwhile, a vacuum is developed within those roll(s) comprising the porous gas-permeable surface(s), thereby continuously withdrawing air from the interstices of the silica particles as they are compressed in the nip of the rolls. The densified silica product of this type of apparatus, and the operations thereof, are also subject to certain deficiencies. Firstly, the densified silica product tends to be non-uniform in density across its cross-section, the greatest density being achieved at the surface(s) of said product adjacent the vacuum roll(s) and the least density tending to occur at the point farthest removed from the vacuum roll(s). Secondly, while in utilizing such apparatuses it is said to be possible to achieve densification to a level of about three or four times that of the original apparent density of the fumed silica powder feed, even greater levels of densing, consistent with maintenance of good silicone rubber reinforcement properties, would be desirable. Finally, the operations of such apparatus are relatively expensive, particularly at densifying rates attractive for commercial operations. This is so because the vacuum equipments needed to handle the large rates of gas removal required from the fluffy fumed silica powder feed represent a relatively large capital expense and because such vacuum equipments normally require considerable maintenance and upkeep.

In accordance with the present invention, however, the above and other problems attendant the densification of voluminous sub-micron powder materials of low apparent density have been vastly ameliorated or substantially eliminated.

OBJECTS OF THE INVENTION

It is a principal object of the invention to provide a novel apparatus for densifying of powder materials.

It is still another object of the invention to provide an apparatus for densifying of sub-micron powder materials of low apparent densities.

It is another object of the invention to provide apparatus for densifying of powder materials which is characterized by its efficient use of energy.

It is another object of the invention to provide an apparatus for densifying of sub-micron powder materials of low apparent densities wherein the uniformity of the finished densified product is improved.

It is another object of the invention to provide an apparatus for densifying of fumed silica powder materials having apparent densities of no greater than about 25 kg/m$^3$ wherein the apparent density of the densified fumed silica product is greater than about 100 kg/m$^3$ and wherein the densified fumed silica product suffers no substantial derogation of its reinforcing properties of polymers and, in particular in silicone rubbers.

Other objects and advantages of the present invention will in part be obvious and will in part appear hereinafter.

SUMMARY OF THE INVENTION

In its broadest aspect, the apparatus of the invention comprises a multiplicity of support rolls arranged, as opposed spaced parallel pairs thereof, to either side of a common axis. Each said pair of spaced rolls defines a densifying station separate and apart from other pairs thereof. The spacing between the rolls of each pair is serially decreased from station to station. Two gas-permeable belts are individually reeved, respectively, over the rolls of one or the other side of said common axis, said belts together defining a generally convergent densifying zone between the adjacent opposed faces thereof and being supported spanwise essentially only by said rolls. The convergent densifying zone is enclosed, such as by means of side plate members which sealingly coact with the edges of the gas-permeable belts. Drive means are provided to drive each of the gas-permeable belts towards the convergent end of the densifying zone and at essentially equal speeds. Feed means are included to introduce powder material to be densified into the divergent end of said densifying zone, said feed means being operative to maintain a substantially complete fill of said densifying zone during densifying operations.

The process of the invention broadly comprises feeding a powder material to be densified into the divergent end of apparatus of the foregoing description, driving each of the gas-permeable belts such that the opposed adjacent surfaces thereof are caused to move toward the convergent end of the densifying zone at essentially equal speeds, collecting densified powder product from the convergent end of said densifying zone and maintaining the feed of said powder material into said densifying zone at a rate sufficient to maintain a substantially complete fill thereof.

DESCRIPTION OF THE PREFERRED EMBODIMENTS

Figure 1:
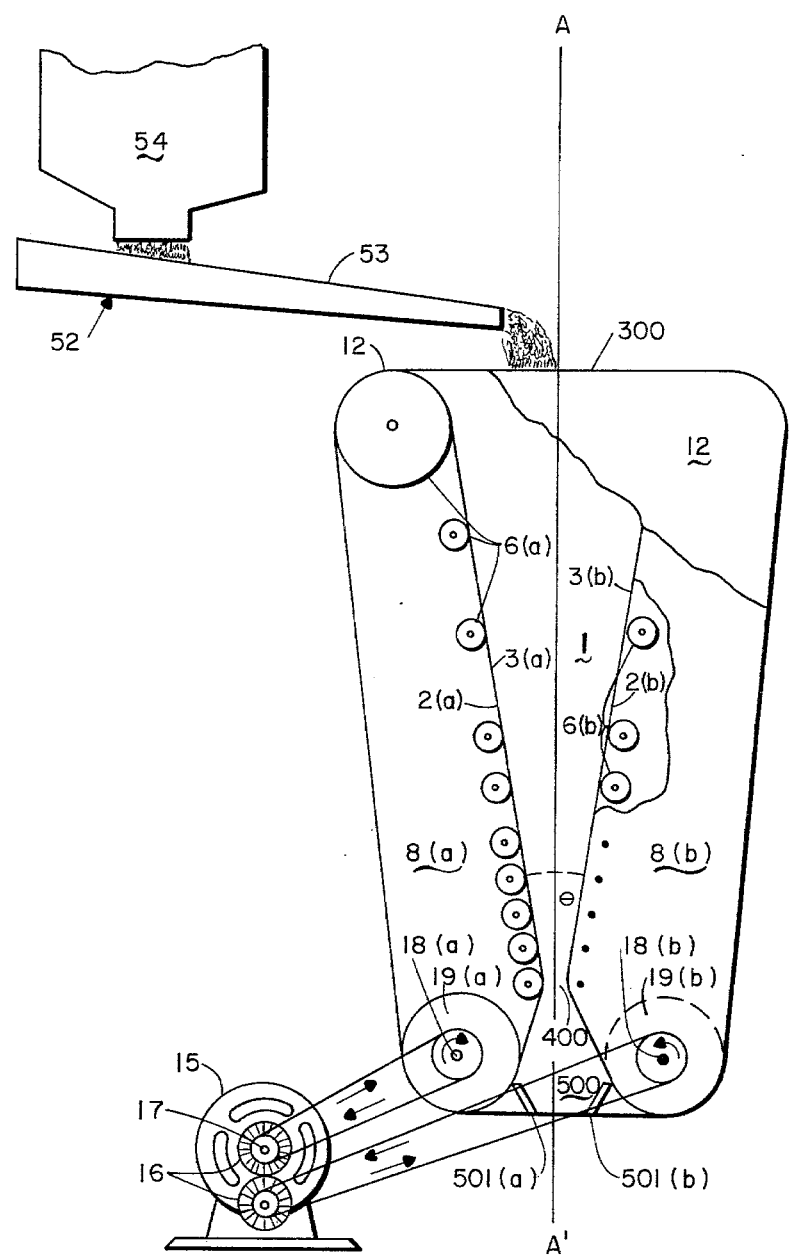
FIG. 1 is a schematic, diagrammatic, partially sectional side view of apparatus in accordance with the invention.

Referring now to FIGS. 1 through 4, wherein like reference numerals refer to like structures, the apparatus of the present invention broadly comprises a pair of opposed, gas-permeable continuous belts 2(a) and 2(b), respectively, which belts are spaced to either side of a common axis A—A' such as to define a generally convergent densifying zone 1 therebetween. The gas-permeable belts 2(a) and 2(b) are each reeved over a multiplicity of journalled support rolls 6(a) and 6(b) therefor such that said belts are each multiply supported spanwise essentially only by said rolls along the convergent zone 1. In this, it is to be noted that, with the exception of the spaces between the last two or three spaced apart, opposed, parallel pairs of rolls 6(a) or 6(b), the presence of any static support members located behind and supporting the belts 2(a) and 2(b) is otherwise avoided. This is so because such static support members would necessarily accomplish their belt support functions in a manner which generates friction as the belts 2(a) and 2(b) pass thereover. Where the contact area of such static support with the belts is substantial, the frictional forces which can be developed therebetween can be relatively high. Not only would such a support arrangement represent a source of belt wear, but it would also represent an important inefficiency in terms of the power required to operate the apparatus. In the construction of the present invention, however, the power of the prime mover is effectively utilized in running the belts 2(a) and 2(b) and only a small portion thereof need be employed merely to overcome sliding friction of the belts against static support members therefor. The support rolls 6(a) and 6(b) are arranged as opposed parallel, spaced apart pairs thereof, the spacing or gap between the rolls 6(a) and 6(b) forming each said opposed pair being serially decreased from the divergent feed end 300 of said convergent densifying zone 1 to the convergent discharge end 400 thereof. Each pair of opposed spaced apart support rolls 6(a) and 6(b) defines a separate and distinct densifying station apart from other pairs thereof. Thus, since the overall densification of the powder material in the apparatus of the invention in effect involves a multiplicity of distinct and incrementally more stringent densifying steps, it is generally preferred that the number of densifying stations provided be at least eight. In the case of sub-micron powder material feeds of low apparent densities, i.e. on the order of 25 kg/m$^3$ or less, it is preferred that the number of densifying stations be at least ten. Desirably, but not necessarily, the linear spacing along common axis A—A' between the opposed pairs of support rolls 6(a) and 6(b) will also be serially decreased from the divergent end to the convergent end of said convergent zone 1. This preferred serial decrease in linear spacing between pairs of support rolls 6(a) and 6(b) arises from the fact that the stresses imposed upon belts 2(a) and 2(b) during operations of the apparatus of the invention tend to increase markedly as the powder material is advanced through the convergent densing zone 1. These are at a maximum just prior to discharge of the densified powder product from the discharge end 400 thereof. In turn, the increases in densifying stresses are generally brought about by the rapidly decreasing ratio in the volume of gas to the volume of solid particles in the powder material advancing through the convergent densifying zone 1. By this is meant that as the powder material advances through a densifying station its gas content is reduced by expression through the gas-permeable belts 2(a) and 2(b). Thus, each subsequent densifying station receives a powder feed of diminished gas volume and increased solid particle density relative to that experienced at prior densifying stations. Of course, for any densifying station of a given gap, the less the proportion of gas to solid particles in the powder material fed thereto, the greater will be the densifying stresses applied to the belts and support rolls thereof. Thus, it is desirable that these densifying stresses be relatively evenly distributed throughout the apparatus and this is fostered by decremental spacing of the densifying stations. Similarly, it is also beneficial that the reduction in gap between opposed rolls 6(a) and 6(b) of each densifying station be limited such that said reduction be no greater than about 25% of the gap of the preceding densifying station. For purposes of the present invention, the term "gap", as used herein, refers to the least dimension between the circumferential surfaces of a pair of support rolls defining a densifying station.

In dealing with extremely light, voluminous sub-micron powder materials, such as fumed silicas or carbon blacks having apparent densities of less than about 25 kg/m$^3$, it is important that the included angle, $\theta$, defined by convergent densifying zone 1 not be excessive, since, if excessive, commercially attractive densifying rates will not normally be achievable without danger of generation of a deleterious pneumatic build-up within the densifying powder material passing through the convergent densifying zone 1. Such pneumatic buildup can be generated at high belt speeds and densifying rates to such an extent as to cause backflow of at least a portion of the powder material towards the divergent feed end 300 of convergent densifying zone 1, thereby to deleteriously affect densifying efficiency and uniformity. This phenomenon occurs when the densifying rate or throughput of the apparatus exceeds the gas handling capacity of the gas-permeable belts 2(a) and 2(b) employed; in other words, the inter-particle gases existing in the densifying powder material cannot be expressed quickly enough through said gas-permeable belts 2(a) and 2(b). This problem, however, can be largely eliminated or at least very much reduced where the included angle of convergency, $\theta$, of zone 1, in terms of both its overall length and as between any two adjacent densifying stations thereof, is limited to no greater than about 10°. Too, by so limiting the angle of convergency of said zone 1, the tensile stresses imposed upon the driven gas-permeable belts 2(a) and 2(b) are minimized and the densifying forces applied to the powder material and directed more nearly in a state of plane strain, these factors being desirable from the standpoint of the service lives of belts 2(a) and 2(b) and the power required to drive them and from the standpoint of densifying efficiency.

Figure 3:
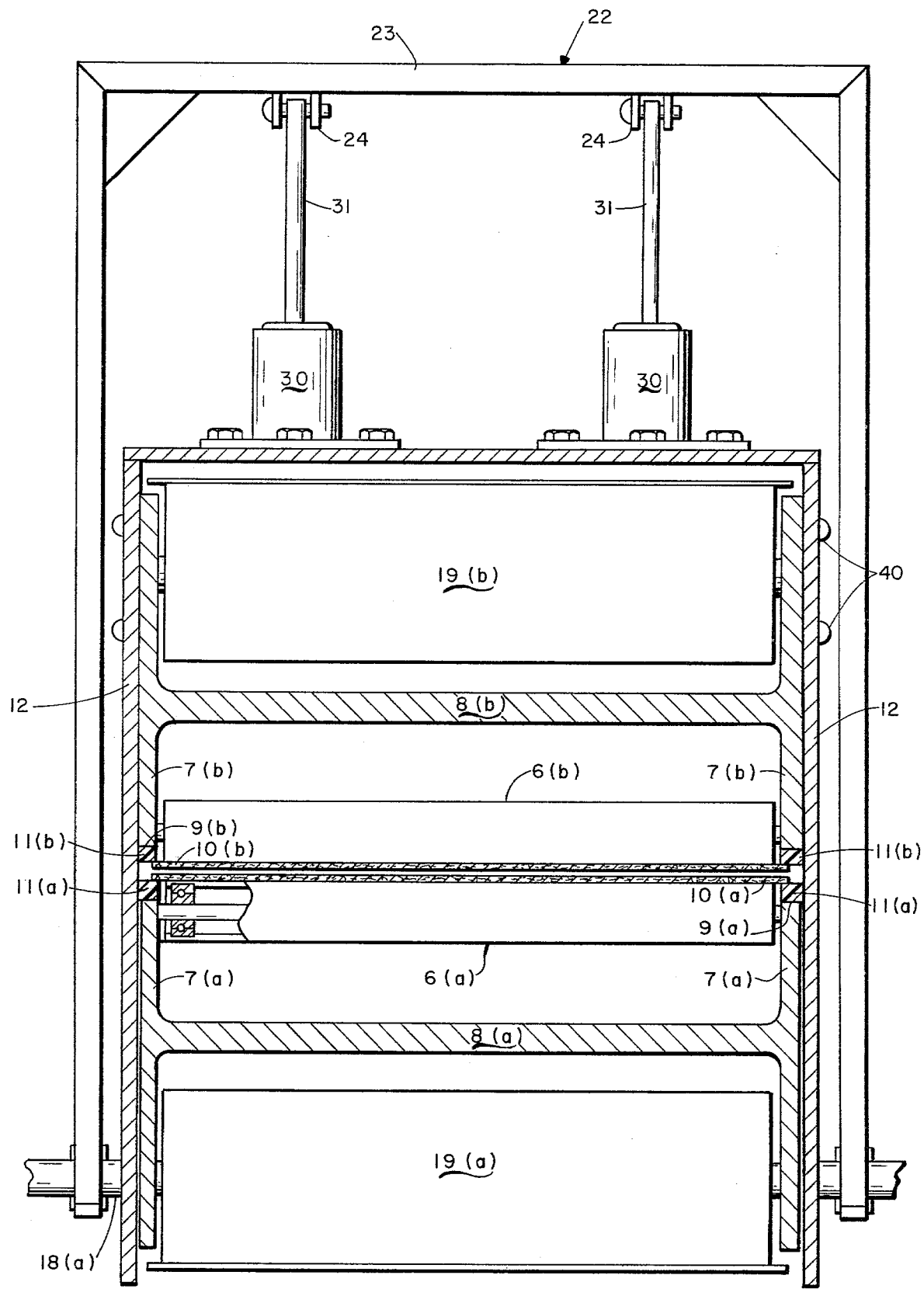
FIG. 3 is a schematic, diagrammatic sectional top view of the apparatus of FIG. 2 taken through lines 2—2' thereof.

It is, of course, further required that an enclosure means be provided whereby any substantial spillout of the powder material from the convergent densifying zone 1 is avoided. The details of one generally suitable enclosure means are depicted in FIG. 3 hereof. Referring now to said FIG. 3, the support rolls 6(a) and 6(b) are seen to be journalled between the interior opposed flanges 7(a) and 7(b) of H-frame members 8(a) and 8(b) in such manner that the circumferential surfaces of said rolls 6(a) and 6(b) are exposed beyond the edge margins 9(a) and 9(b) of said flanges 7(a) and 7(b). The widths of gas-permeable belts 2(a) and 2(b) are somewhat greater than the spans of rolls 6(a) and 6(b) such that free edges 10(a) and 10(b) of belts 2(a) and 2(b) result and extend beyond the ends of the rolls 6(a) and 6(b). Rub strips, 11(a) and 11(b), which are continuous throughout the length of convergent densifying zone 1, are affixed to the edge margins 9(a) and 9(b) of flanges 7(a) and 7(b) of frame members 8(a) and 8(b). These rub strips 11(a) and 11(b) are composed of a smooth, hard, low friction material, such as high density polyethylene material and are of sufficient thickness as to fill the gap between each of the edge margins 9(a) and 9(b) and the free edges 10(a) and 10(b) of belts 2(a) and 2(b). By this construction, therefore, there is formed a sealing engagement between the belts 2(a) and 2(b) and the rub strips 11(a) and 11(b). Completion of the closure arrangement for convergent densifying zone 1 is made by the provision of a pair of sideplate members 12 which are held adjacent the exteriors of flanges 7(a) and 7(b).

Referring now to FIG. 1, each of the belts 2(a) and 2(b) is driven by a prime mover 15 such that the opposed belt surfaces 3(a) and 3(b) are advanced toward the convergent end of densifying zone 1 at essentially equal speeds. This can be achieved, for instance, by suitable gearing 16 between the output shaft 17 of prime mover 15 and the drive shafts 18(a) and 18(b) of drive rolls 19(a) and 19(b). It should be understood, however, that the invention is not intended to be limited to the specific belt driving arrangement shown in said FIG. 1 since many suitable alternative arrangements, including use of two synchronized direct drive prime movers, each driving one of the pair of gas-permeable belts 2(a) and 2(b), will suggest themselves as obvious equivalents to those skilled in the art.

The gas-permeable belts 2(a) and 2(b) can be constructed of substantially any suitable textile material having adequate permeability with respect to gas flow therethrough but which material is sufficiently impermeable with respect to the powder material to be densed as to prevent passage thereof. Further, of course, the materials for belts 2(a) and 2(b) require adequate strength and durability for use as driven elements under substantial loads. Such gas-permeable belting materials are known and can comprise, for instance, suitably reinforced woven cotton or cotton-polyester fabrics. Bearing the above considerations in mind, one of skill in the art to which this invention pertains can select appropriate belt materials based upon the particular powder material to be densified, the extent of densifying treatment desired and the design parameters of the apparatus related to throughput.

Figure 2:
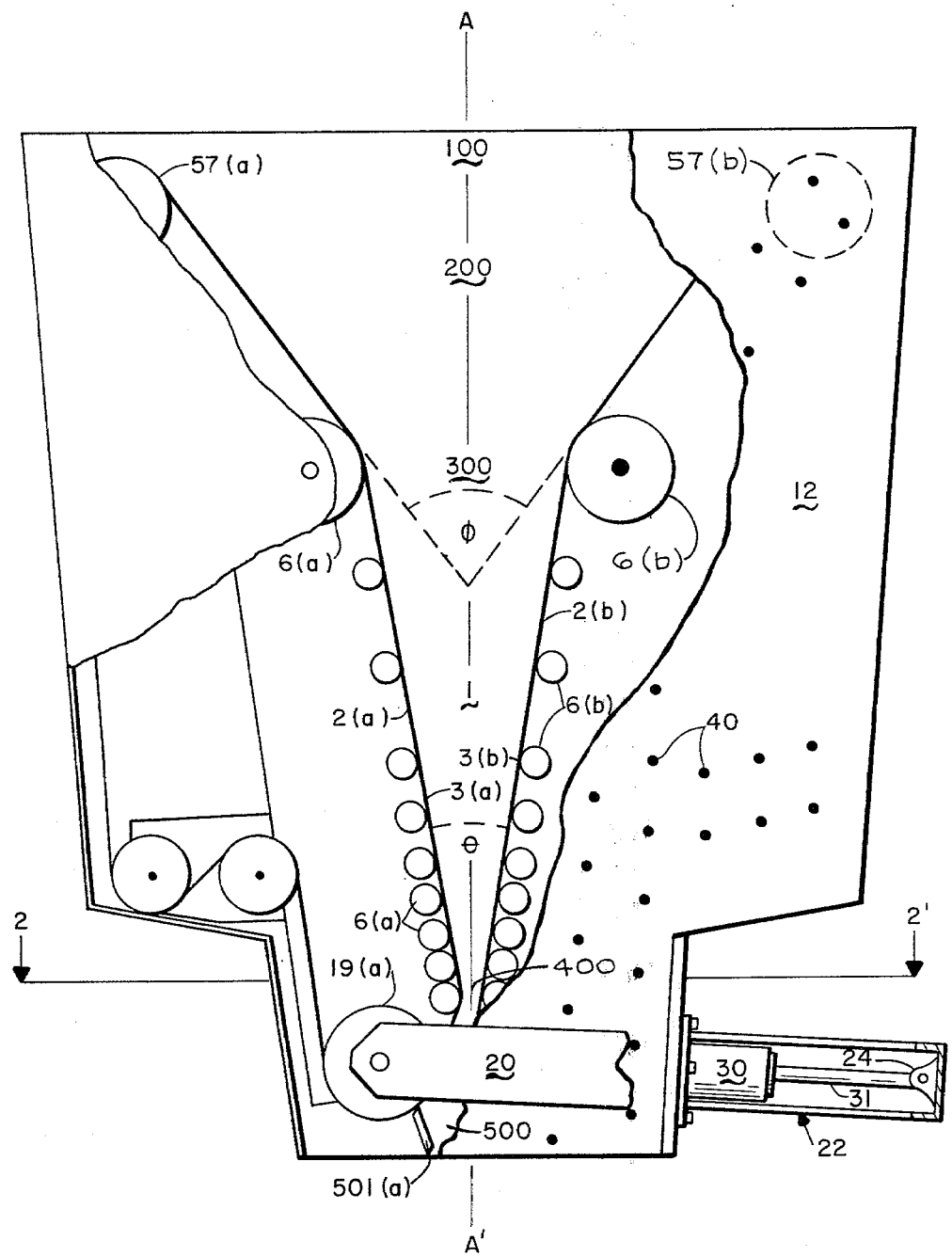
FIG. 2 is a schematic, diagrammatic, partially sectional side view of apparatus in accordance with the invention bearing certain preferred embodiments thereof.
Figure 4:
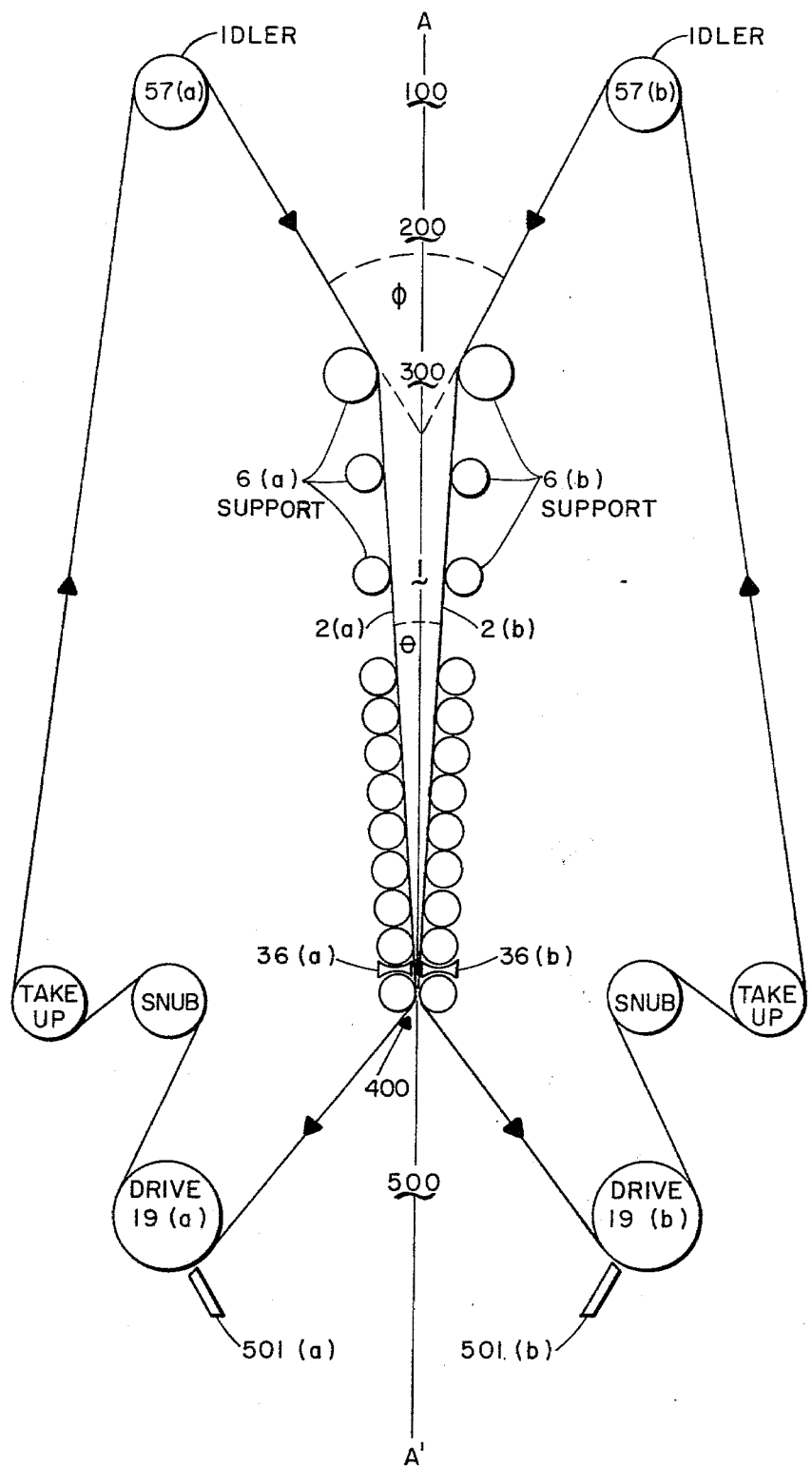
FIG. 4 is a schematic, diagrammatic side view of a preferred support roll layout and a typical suitable belt reeving diagram for use in the apparatus of the invention.

In order that the uniformity of the densing accomplished by the apparatus of the present invention be maximized it is important that said apparatus be provided with a feed means by which convergent densifying zone 1 is maintained at a substantially complete fill during operations. In the apparatus of FIG. 1, said feed means takes the form of a vibratory trough feeder 52, the vibratory trough 53 thereof being itself fed from a powder storage hopper 54. Control of the rate of powder fed into the divergent end of convergent densifying zone 1 utilizing a feed means of this type can usually be had by controlling the frequency and/or amplitude of vibration of the trough 53 and/or by control of the angle of depression of said trough 53. For many powders of interest a relatively simple feed means, separate and distinct from but associated with the densifying apparatus of the invention, (such as shown schematically in FIG. 1) will be found adequate to maintain a substantially complete fill of convergent densifying zone 1. However, for sub-micron powder feeds of low apparent densities, feed means conventional in the art of powder conveyance, such as screw conveyors, gravity drop hoppers or vibratory feeders, may be found difficult to operate so as to achieve a uniform rate of feed to the convergent densifying zone 1. In FIGS. 2 and 4 hereof there is depicted an arrangement whereby the conveyance of sub-micron powder materials of low apparent density into convergent densifying zone 1 in a manner such as to assure maintenance of a complete fill thereof is facilitated. Referring now in particular to FIG. 2, it will be first seen that the densifying apparatus of the invention is oriented to place convergent zone 1 in a substantially vertical posture with the divergent feed end 300 thereof uppermost. Such substantially vertical orientation of the densifying apparatus of the invention is itself beneficial in that it takes advantage of the force of gravity in aiding the conveyance of powder material into the convergent densifying zone 1 and in maintaining a substantially complete fill thereof. Located immediately above the divergent end 300 of said densifying zone 1 and integral therewith is a relatively more widely convergent feed zone 200, said integral feed zone 200 being defined by continuation of the pair of belts 2(a) and 2(b) to essentially equal, but substantially greater, lengths than necessary simply to define the convergent densifying zone 1. The bottom of feed zone 200 is also regarded as the feed end 300 of convergent densifying zone 1 and is defined by the uppermost pair of opposed support rolls 6(a) and 6(b) of convergent densifying zone 1. The feed end 100 of feed zone 200, on the other hand, is defined by a pair of opposed idler rolls 57(a) and 57(b) which are spaced at a substantially greater distance apart than that of the uppermost of the pairs of rolls 6(a) and 6(b), and which idler rolls, in addition, are spaced at a linear distance above the uppermost pair of rolls 6(a) and 6(b) as to define a convergent feed zone 200 having an included angle, $\phi$, substantially greater than angle $\theta$. Gas-permeable belts 2(a) and 2(b) are in this embodiment of the invention, and as best shown in FIG. 4, reeved generally over their respective drive rolls, 19(a) and 19(b), support rolls 6(a) and 6(b), and idler rolls 57(a) and 57(b), thereby to establish the relatively widely convergent feed zone 200 which is integral with and feeds the substantially more narrowly convergent densifying zone 1. Since the major functions of feed zone 200 are to preliminarily partially degas the powder material feed and to charge same into convergent densifying zone 1, the forces acting upon the gas-permeable belts 2(a) and 2(b) within said feed zone 200 will normally be relatively quite low. Therefore, it will usually be found unnecessary to provide said belts with additional spanwise support rolls therefor within said zone 200 although such provision may be made if desired.

The presence of such a widely convergent feed zone 200 markedly reduces the burden of maintaining a substantially complete fill of the more narrowly convergent densifying zone 1, particularly where extremely light and fluffy sub-micron powder material feeds of no more than about 25 kg/m$^3$ apparent densities are to be densified. Said feed zone 200 ameliorates the effects of minor bridging of powder feed devices and other temporary obstructions or perturbations of flow of powder material into the densifying apparatus of the invention and thus aids in maintaining the substantially complete fill of convergent densifying zone 1 essential to good densified product uniformity. It will be seen, of course, that in order to maintain such substantially complete fill of the densifying zone 1 utilizing the apparatus of FIG. 2 or 4, it is only necessary to control the flow of powder material from the feed means into the feed end 100 of feed zone 200 to the extent of maintaining at least some fill thereof rather than requiring the more rigorous and difficultly attainable standard of a maintaining substantially complete fill thereof.

Another preferred embodiment of the invention resides in the provision of means by which the densifying forces applied by at least the latter densifying stations of the apparatus are maintained despite changes which may occur in the apparent density of the feed powder material. This, in turn, can be accomplished by suitable adjustment during operations, responsive to such changes, of the "gap ratio" which term, for purposes of the present invention, is defined as the numerical quotient of the gap between the most widely spaced pair of support rolls 6(a) and 6(b) of convergent densifying zone 1 divided by the gap between the most narrowly spaced pair of support rolls at discharge end 400 thereof. As will be appreciated, the overall densifying of a starting powder material feed of constant apparent density will, in major part, be dictated by the aforementioned gap ratio. However, in the case of a submicron powder material feed it will often be the case that the apparent density of the material fed to the densifying apparatus will not, in fact, be uniform. Under these circumstances, maintenance of a constant gap ratio during densifying operations will generally result in a densified product whose apparent density will vary in response to variations in apparent density of the starting powder material feed. In addressing this problem, it is much preferred that the apparatus of the invention include means by which the gap ratio is adjusted in response to changes in apparent density of the powder material feed, thereby to assure that the overall densifying forces applied to the densifying powder material are maintained at least relatively constant. This, of course, results in a densified powder product of improved uniformity over a similar densified product wherein the gap ratio of the apparatus is fixed. Referring now to FIGS. 2 and 3, there appears a suitable arrangement by which such gap ratio adjustment can be effectuated. Therein, frame members 8(b), carrying all support rolls 6(b), are rigidly affixed to each of the pair of side plate members 12 associated therewith such as by means of a plurality of fasteners 40. The frame members 8(a), on the other hand, carrying all support rolls 6(a), are pivotally journalled to said pair of side plate members 12 about that support roll 6(a) located at the feed end 300 of convergent densifying zone 1, thereby allowing said frame members 8(a) to swing to and fro between the side plate members 12 and to thereby allow adjustments of the gap between that pair of rolls 6(a) and 6(b) at discharge end 400 while maintaining the gap between that pair of rolls 6(a) and 6(b) at feed end 300 constant. Further, in this regard, the drive shaft 18(a) of drive roll 19(a) is carried through slots (not shown) provided in each of the side plate members 12. The extended portions of the shaft 18(a) are journalled in the side arms 20 of a yoke 22. Constant force producing means, such as a pair of hydaulic cylinders 30, are affixed equidistantly to either side of the midline of the back of the rigid frame member 8(b)/side plate member 12 arrangement. The working ends of the hydraulic cylinder ram members 31 are pinned to clevises 24 of transverse yoke member 23. In operations, hydraulic pressure is applied equally to cylinders 30, thereby to cause the ram members 31 thereof to stroke with equal force toward the top of the drawing and to transmit their respective forces, through yoke 22 and shaft 18(a), to the lower portion of pivotally mounted frame meber 8(a). This action, of course, yieldingly urges the support roll(s) 6(a) of the densifying stations located near the discharge end 400 of convergent densifying zone 1 towards their closed condition with respect to their corresponding opposed roll(s) 6(b). Due to the densifying powder material passing through the apparatus the gap between the rolls of the station defining the discharge end 400 of convergent densifying zone 1 will not normally achieve full closure but rather will continuously adjust itself under the urging of the activated hydraulic cylinders 30 as as to maintain at least relatively constant densifying forces against the powder material coursing through the lowermost densifying stations. Where the density and flow of the powder material feed through convergent densifying zone 1 is constant, the gap at the last densifying station will also tend to establish itself as essentially constant, thereby to also establish the aforementioned gap ratio as essentially constant. However, where the apparent density of the powder material feed charged to the apparatus or the flow thereof is subject to change said gap, and the gap ratio, will responsively adjust themselves thereto, thus preserving constancy of densifying forces thereagainst and providing a densified product of improved uniformity. Obviously, the gap ratio adjustment arrangement disclosed above need not take the specific form of FIGS. 2 and 3, it being obvious that many changes and modifications thereof may be had once the principles of operations and intended effects thereof are fully understood. For instance, suitable alternative constant force applying means may also take the forms of pneumatic rams, counterweights, springs, electromechanical feedback controls and the like and need not comprise hydraulic cylinders as specifically shown. Moreover, suitable arrangements of the frame members and side plate members other than that specifically shown and described can also be readily had by which adjustment of the gap ratio can be effectuated.

Another preferred embodiment of the invention resides in the provision of a divergent disengagement zone 500 which is integral with the discharge end 400 of convergent densifying zone 1. This embodiment of the invention is depicted in FIGS. 1, 2 and 4 hereof wherein it is seen that immediately following the last pair of support rolls 6(a) and 6(b) which define said discharge end 400, the gas-permeable belts 2(a) and 2(b) are each extended and carried at sharply divergent angles to below said discharge end 400 and are then reeved about more widely spaced drive rolls 19(a) and 19(b), thereby to define the integral divergent disengagement zone 500. The presence of said divergent disengagement zone 500 aids in separation of the densified powder product from the opposed facing surfaces 3(a) and 3(b) of the gas-permeable belts 2(a) and 2(b). Further in this regard, it may also be found helpful to additionally provide doctor blades 501(a) and 501(b) running spanwise between side plate members 12 and which doctor blades are fixed in working association with the belt surfaces 3(a) and 3(b) passing over drive rolls 19(a) and 19(b). Said doctor blades 501(a) and 501(b) serve to continuously remove accreted densified powder product from the surfaces 3(a) and 3(b) of belts 2(a) and 2(b).

Yet another preferred embodiment of the invention resides in the provision of essentially equal gaps in the two or three final sequential densifying stations of convergent densifying zone 1. Where the powder material feed is subjected to two or more passes sequentially through two or more equally, but minimally gapped final stations, the apparent density of the densified product is maximized. Accordingly, in the embodiment of the invention depicted in FIG. 4, the gaps between the last two pairs of rolls 6(a) and 6(b) are seen to be essentially equal, thereby to have the practical effect of subjecting the powder material passing through convergent zone 1 to two passes through the final, minimally gapped, densifying station. Advantageously, the gas-permeable belts 2(a) and 2(b) are also substantially continuously supported spanwise throughout their respective passages between the final, equally gapped, densifying stations. This can be accomplished by the provision of smooth, stiff support members 36(a) and 36(b) oriented spanwise and which essentially fill the spaces between the interiormost circumferential surfaces of rolls 6(a) and the rolls of 6(b) of the equally spaced final densifying stations, thereby to provide, in cooperation with said support rolls, substantially continuous spanwise support surfaces for the belts 2(a) and 2(b) as they pass through said final densifying stations. Said support members 36(a) and 36(b) act to prevent pillowing of the gas permeable belts 2(a) and 2(b).

Utilizing densifying apparatus and procedures in accordance with the above description, a rubber reinforcing grade of sub-micron fumed fluffy silica having an apparent density of about 2.3 lbs/ft$^3$ (37 kg/m$^3$) was densified, in separate runs, to apparent densities of about 5.2 lbs/ft$^3$ (83 kg/m$^3$) and about 11.8 lbs/ft$^3$ (189 kg/m$^3$), respectively. The fluffy and two densified silica products were then each compounded under standard conditions and at two loadings, into separate batches of a heat cured silicone rubber composition based on a methyl vinyl siloxane gum, the two separate loadings of the silicas being 10 and 30 percent, respectively, based on the weight of the gum. The resulting silica-reinforced silicone rubber composition samples were then molded into tensile bars and mold cured for about 10 minutes at 290° F. followed by removal from the mold and further curing thereof for about 4 hours at about 300° F. The cured tensile bar samples were then subjected to hardness, tear, tensile, modulus, compression set and clarity tests utilizing art-recognized test procedures. Within each of the groups of samples containing equal silica loadings, no substantial differences in any of the tested properties were noted. Said lack of substantial differences in these several cured rubber properties indicates that the densifying treatments of the fluffy silica, even though the most stringent thereof increased the apparent density thereof by a factor of about 5, had little or no effect upon the dispersibility characteristics of the product silicas under standard silicone rubber compounding conditions.

Similar tests were conducted utilizing the two densified silica products at 10 and 20 weight percent loadings in each of a vinyl acetate-ethylene copolymer formulation and an EPDM rubber formulation. Again, physical testing of the resulting silica-loaded polymer compositions indicated only insubstantial differences, if any, in the reinforcement properties of the densified silica products even though the more stringently densified silica product employed had an apparent density of about twice that of the less stringently densified silica product.

While this invention has been described hereinbefore with respect to certain embodiments thereof, it is not intended to be limited thereto, and it should be understood that variations and modifications which are obvious to those skilled in the art may thus be made without departing from the essential spirit or scope thereof.

The embodiments of the invention in which an exclusive property or privilege is claimed are defined as follows:

1. Powder densifying apparatus comprising: A plurality of densifying stations positioned about a common axis, each said station being defined by a pair of spaced-apart, parallel opposed support rolls, the gap between the rolls of each said station being sequentially decreased from station to station;
   a gas permeable belt reeved over and supported spanwise by the support rolls positioned to the other side of said common axis, said reeved and supported belts together defining a convergent densifying zone;
   means to enclose said convergent densifying zone whereby escape of powder material therefrom is prevented;
   means to drive said gas permeable belts at substantially equal speeds toward the convergent end of said densifying zone; and
   means to supply powder material into the divergent end of said convergent densifying zone at a rate sufficient to maintain a substantially complete fill thereof.

2. The densifying apparatus of claim 1 wherein the number of said densifying stations is at least eight.

3. The densifying apparatus of claim 1 wherein the number of said densifying stations is at least ten.

4. The densifying apparatus of claim 1 wherein the included angle of convergency of said densifying zone, $\theta$, is no greater than about 10°.

5. The densifying apparatus of claim 1 wherein said convergent densifying zone is oriented substantially vertically, the divergent end thereof being uppermost.

6. The densifying apparatus of claim 5 comprising, in addition, a convergent feed zone integral with the divergent end of said convergent densifying zone, the angle of convergency; $\phi$, of said feed zone being substantially greater than the angle of convergency $\theta$, of said densifying zone.

7. The densifying apparatus of claim 6 wherein said convergent feed zone is defined by extensions of said gas permeable belts to beyond the divergent end of said convergent densifying zone, each said belt extension being reeved over an idler roll spaced to the corresponding side of said common axis and above the uppermost of said support rolls.

8. The densifying apparatus of claim 1 comprising, in addition, a divergent disengagement zone integral with the convergent end of said convergent densifying zone.

9. The densifying apparatus of claim 8 wherein said divergent disengagement zone is defined by extensions of said gas permeable belts to beyond the convergent end of said convergent densifying zone, each said belt extension being reeved over a supporting roll therefor spaced to the corresponding side of said common axis and below the last of said support rolls.

10. The densifying apparatus of claim 9 comprising, in addition, doctor blade means associated with each said supporting roll, said blade means being positioned to remove densified powder material from the belt.

11. The densifying apparatus of claim 1 wherein the gaps between the pairs of rolls of the last two or three densifying stations of the convergent densifying zone are essentially equal.

12. The densifying apparatus of claim 11 wherein a stiff and smooth support member is intersposed between the support rolls of each side of those densifying stations having essentially equal gaps therebetween, thereby to prevent pillowing of the belt means between said rolls.

13. The densifying apparatus of claim 1 wherein the support rolls positioned to each side of said common axis journalled in separate frame members therefor; wherein the frame member associated with one set of said rolls is fixed between a pair of parallel sideplate members, said sideplate member defining said enclosure means to form closure for said convergent densifying zone; wherein the frame member associated with the other set of said rolls is pivotally journalled at its divergent end between said sideplate members; and wherein controllable, constant force producing means communicates with said pivotally journalled frame member to yieldingly urge the free end of said pivotally journalled frame member with constant force toward the fixed frame member, thereby to adjust the gap ratio of the convergent densifying zone in reponse to variation of density of powder material fed to the convergent densifying zone during operations.

* * * * *

UNITED STATES PATENT AND TRADEMARK OFFICE
CERTIFICATE OF CORRECTION

PATENT NO. : 4,325,686
DATED : April 20, 1982
INVENTOR(S) : Gonzalo S. Leon; John E. Fraize; Richard C. Fortier It is certified that error appears in the above-identified patent and that said Letters Patent are hereby corrected as shown below:

Col. 5, line 62, after "These" insert --forces--.

Col. 6, line 53, cancel "and" and substitute therefor --are--.

Col. 9, line 65, cancel "hydaulic" and substitute therefor --hydraulic--.

Col. 10, line 7, cancel "meber" and substitute therefor --member--.

Col. 10, line 18, cancel "as", first occurrence, and substitute therefor --so--.

Claim 1, Col. 12, line 19, after "rolls" insert --positioned to one side of said common axis and another gas permeable belt reeved over and supported spanwise by the support rolls--.

Signed and Sealed this

Tenth Day of August 1982

[SEAL]

Attest:

Attesting Officer

GERALD J. MOSSINGHOFF
Commissioner of Patents and Trademarks